United States Patent
Abe

(10) Patent No.: US 11,068,572 B2
(45) Date of Patent: Jul. 20, 2021

(54) HIGH SPEED BIOLOGICAL AUTHENTICATION OF MULTIPLE PERSONS

(71) Applicant: FUJITSU LIMITED, Kawasaki (JP)

(72) Inventor: Narishige Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 391 days.

(21) Appl. No.: 16/240,886

(22) Filed: Jan. 7, 2019

(65) Prior Publication Data
US 2019/0213310 A1   Jul. 11, 2019

(30) Foreign Application Priority Data

Jan. 11, 2018   (JP) .............................. JP2018-002899

(51) Int. Cl.
| | | |
|---|---|---|
| *G06F 21/32* | (2013.01) | |
| *G06F 21/46* | (2013.01) | |
| *G06F 21/83* | (2013.01) | |

(52) U.S. Cl.
CPC .............. *G06F 21/32* (2013.01); *G06F 21/46* (2013.01); *G06F 21/83* (2013.01); *G06F 2221/2117* (2013.01)

(58) Field of Classification Search
CPC .......... G06F 21/32; G06F 21/46; G06F 21/83; G06F 2221/2117; G06Q 20/40145; H04L 63/0861; G06K 9/00221; G06K 9/00288; G06K 9/00328; G06K 9/00617; G06K 9/00892
See application file for complete search history.

(56) References Cited

U.S. PATENT DOCUMENTS

| | | | |
|---|---|---|---|
| 9,152,846 B2 | 10/2015 | Kiyosawa | |
| 2003/0039380 A1* | 2/2003 | Sukegawa | .......... G06K 9/00288 |
| | | | 382/118 |

(Continued)

FOREIGN PATENT DOCUMENTS

| | | |
|---|---|---|
| JP | 2005-275508 | 10/2005 |
| JP | 2008-65651 | 3/2008 |

OTHER PUBLICATIONS

EESR—The Extended European Search Report of European Patent Application No. 19150176.6 dated May 23, 2019.

*Primary Examiner* — Richard A McCoy
(74) *Attorney, Agent, or Firm* — Fujitsu Patent Center

(57) ABSTRACT

A first similarity is calculated between a first feature amount of first biological information acquired from a first person among multiple persons to be subjected to authentication and a second feature amount of second biological information acquired from a second person among the multiple persons to be subjected to authentication, and multiple second similarities between the first feature amount and multiple registered feature amounts of biological information acquired from multiple registered persons are calculated. When authentication of the first person is successful, first registered feature amounts to be subjected to similarity calculation are selected from among the multiple registered feature amounts, based on the first similarity and the multiple second similarities. Third similarities are calculated between the second feature amount and the first registered feature amounts, and authentication on the second person to be subjected to authentication is executed based on the third similarities.

15 Claims, 9 Drawing Sheets

(56) References Cited

U.S. PATENT DOCUMENTS

| | | | |
|---|---|---|---|
| 2007/0098230 A1* | 5/2007 | Norita | G06K 9/00288 |
| | | | 382/118 |
| 2010/0316265 A1 | 12/2010 | Nakanowatari et al. | |
| 2012/0308141 A1* | 12/2012 | Okubo | G06K 9/6298 |
| | | | 382/192 |
| 2014/0050373 A1 | 2/2014 | Kiyosawa | |
| 2014/0241593 A1 | 8/2014 | Koseki et al. | |
| 2015/0379254 A1* | 12/2015 | Matsuda | G06K 9/00892 |
| | | | 726/19 |

* cited by examiner

FIG. 2

| ID | REGISTERED FEATURE AMOUNT |
|---|---|
| 1 | $t_1$ |
| 2 | $t_2$ |
| ⋮ | ⋮ |
| N | $t_N$ |

| | $f_2$ | $f_3$ |
|---|---|---|
| $f_1$ | $S_{1\_2}$ | $S_{1\_3}$ |

HIGH SPEED BIOLOGICAL AUTHENTICATION OF MULTIPLE PERSONS

CROSS-REFERENCE TO RELATED APPLICATION

This application is based upon and claims the benefit of priority of the prior Japanese Patent Application No. 2018-2899, filed on Jan. 11, 2018, the entire contents of which are incorporated herein by reference.

FIELD

The embodiment discussed herein is related to high speed biological authentication of multiple persons.

BACKGROUND

Biological authentication is used in a wide range of fields such as the management of entries and exits to and from buildings and rooms, the management of access of personal computers (PCs), and the unlocking of smartphones.

A technique for improving the accuracy of determination in a face authentication process executed based on a change in facial orientation, a change in facial expression, illumination conditions, or a combination thereof is known (refer to, for example, Patent Literature 1). In addition, a technique for improving the convenience of a personal authentication device by composite authentication is known (refer to, for example, Patent Literature 2).

CITATION LIST

Patent Literature

[Patent Literature 1] Japanese Laid-open Patent Publication No. 2008-65651
[Patent Literature 2] Japanese Laid-open Patent Publication No. 2005-275508

SUMMARY

According to an aspect of the invention, a first similarity is calculated between a first feature amount of first biological information acquired from a first person among multiple persons to be subjected to authentication and a second feature amount of second biological information acquired from a second person among the multiple persons to be subjected to authentication, and multiple second similarities between the first feature amount and multiple registered feature amounts of biological information acquired from multiple registered persons are calculated. Authentication is executed on the first person, based on the multiple second similarities, and, when the authentication of the first person is successful, first registered feature amounts to be subjected to similarity calculation are selected from among the multiple registered feature amounts, based on the first similarity and the multiple second similarities. Third similarities are calculated between the second feature amount and the first registered feature amounts, and authentication on the second person to be subjected to authentication is executed based on the third similarities.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a DB;
FIG. 3 illustrates an example of a similarity map.

DESCRIPTION OF EMBODIMENT

Measures for simultaneously presenting biological information of multiple persons to improve security in the control of access to security areas in which safes, important documents, and the like are placed and permitting access when the multiple persons are successfully authenticated are started to be introduced.

In the case where a biological authentication device determines, based on multiple biological information items simultaneously presented and registered information, whether or not multiple persons are successfully authenticated, there is a problem that a processing time period increases in proportion to the number of biological information items simultaneously presented.

It is preferable to execute a process of performing authentication on multiple persons at high speed.

Figure 1:
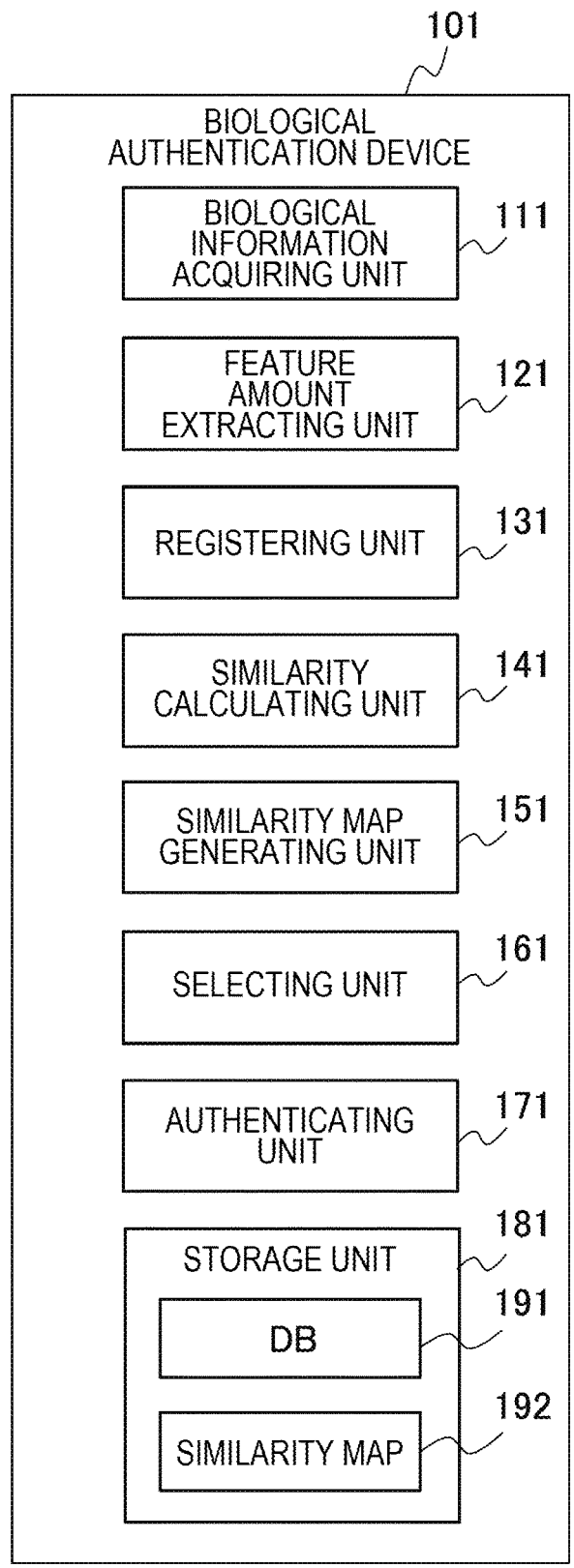
FIG. 1 is diagram illustrating a configuration of a biological authentication device according to an embodiment.

FIG. 1 is a diagram illustrating a configuration of a biological authentication device according to an embodiment.

The biological authentication device 101 includes a biological information acquiring unit 111, a feature amount extracting unit 121, a registering unit 131, a similarity calculating unit 141, a similarity map generating unit 151, a selecting unit 161, an authenticating unit 171, and a storage unit 181.

The biological information acquiring unit 111 acquires biological information of a target person (registered person) to be subjected to a registration process or a target person (to be subjected to authentication) to be subjected to an authentication process. The biological information is, for example, a facial image of the target person, a fingerprint of the target person, a vein pattern of a palm of the target person, or the like. The biological information acquiring unit 111 is, for example, a color camera, a fingerprint sensor, an infrared camera, a depth camera, a thermal camera, or the like.

The feature amount extracting unit 121 extracts a feature amount indicating a feature of the biological information from the acquired biological information. The feature amount is, for example, expressed by a real vector with a number m (m is an integer of 2 or more) of elements.

The registering unit 131 registers, as a registered feature amount, a feature amount extracted from the biological information of the registered person in a database (DB) 191 in a process of registering biological information.

In the biological authentication device 101, the similarity calculating unit 141 and the authenticating unit 171 coordinate with each other to execute a crosschecking process on the feature amount of the target person to be subjected to authentication and determine whether or not the authentication of the target person is successful. The crosschecking process includes a process, to be executed by the similarity calculating unit 141, of calculating a similarity between the feature amount of the target person to be subjected to authentication and a registered feature amount or a feature amount to be subjected to crosschecking and a process, to be executed by the authenticating unit 171, of determining whether or not the calculated similarity is equal to or larger than a threshold. Operations of the similarity calculating unit 141 and the authenticating unit 171 are described later in detail. The feature amount to be subjected to crosschecking is a feature amount to be subjected to similarity calculation.

The similarity calculating unit 141 calculates similarities $S_a$ between a reference feature amount among multiple feature amounts extracted from biological information of persons to be subjected to authentication and registered feature amounts of multiple registered persons recorded in the DB 191, in the process of executing the authentication on the target person. In addition, the similarity calculating unit 141 calculates similarities $S_b$ between the reference feature amount among the multiple feature amounts extracted from the biological information of the persons to be subjected to authentication and feature amounts that are among the multiple extracted feature amounts and exclude the reference feature amount. Furthermore, the similarity calculating unit 141 calculates a similarity between a feature amount, which is among the multiple feature amounts and is not the reference feature amount, and the feature amount selected by the selecting unit 161 and to be subjected to crosschecking.

In the embodiment, as feature amounts are more similar to each other, a similarity between the feature amounts is larger. In the embodiment, as feature amounts are more different from each other, a similarity between the feature amounts is smaller. Various methods may be used to calculate similarities. For example, the inverse of an L2 norm, the inverse of an L1 norm, or a cosine similarity may be used. For example, when a feature amount A=(a1, a2, . . . , am), a feature amount B=(b1, b2, . . . , bm), and the inverse of an L2 norm is used as a similarity, the similarity between the feature amount A and the feature amount B=$1/((a1-b1)^2 + (a2-b2)^2 + \ldots + (am-bm)^2)^{1/2}$.

The similarity map generator 151 records the similarities $S_b$ calculated by the similarity calculating unit 141 in a similarity map 192.

The selecting unit 161 selects, from the DB 191 based on the similarity map 192 and the similarities $S_a$, a feature amount to be subjected to crosschecking and to be used to determine whether or not the authentication of a person, who is among multiple persons to be subjected to authentication and other than a person associated with the reference feature amount, is successful. As the feature amount to be subjected to crosschecking, a registered feature amount of at least one registered person is selected.

The authenticating unit 171 determines whether or not the authentication of each of the multiple persons to be subjected to authentication is successful. For example, the authenticating unit 171 determines, based on similarities between a feature amount of a first person among the multiple persons to be subjected to authentication and multiple registered feature amounts recorded in the DB 191, whether or not the authentication of the first person is successful. In addition, the authenticating unit 171 determines, based on similarities between a feature amount of a second person among the multiple persons to be subjected to authentication and respective feature amounts selected by the selecting unit 161 and to be subjected to crosschecking, whether or not the authentication of the second person is successful.

For example, the authenticating unit 171 determines that the authentication of the first person to be subjected to authentication is successful when one of the similarities between the feature amount of the first person and the multiple registered feature amounts recorded in the DB 191 is equal to or larger than the threshold. In addition, for example, the authenticating unit 171 determines that the authentication of the second person to be subjected to authentication is successful when one of the similarities between the feature amount of the second person and the feature amounts that are selected by the selecting unit 161 and to be subjected to crosschecking is equal to or larger than the threshold. The storage unit 181 is a storage device configured to store information to be used by the biological authentication device 101. The storage unit 181 is configured to store the DB 191 and the similarity map 192.

The DB 191 is a database in which registered feature amounts of biological information of registered persons are recorded.

FIG. 2 illustrates an example of the DB 191.

In the DB 191 illustrated in FIG. 2, IDs and registered feature amounts are associated with each other and recorded.

The IDs are information (identifiers) identifying persons registered in the biological authentication device 101.

The registered feature amounts are feature amounts indicating feature amounts of biological information of the registered persons. In the DB 191 illustrated in FIG. 2, feature amounts of biological information of a number N (N is an integer of 2 or more) of registered persons are recorded as registered feature amounts $t_1$ to $t_N$.

In the similarity map 192, the similarities $S_b$ between the reference feature amount and the feature amounts other than the reference feature amount are recorded.

FIG. 3 illustrates an example of the similarity map 192.

It is assumed that, in a biological authentication process according to the embodiment, three feature amounts $f_1$, $f_2$, and $f_3$ are extracted from biological information acquired from three persons to be subjected to authentication. In the similarity map 192 illustrated in FIG. 3, a similarity $S_{1\_2}$ between the feature amount $f_1$ serving as a reference feature amount and the feature amount $f_2$ and a similarity $S_{1\_3}$ between the feature amount $f_1$ and the feature amount $f_3$ are recorded.

The aforementioned configuration of the biological authentication device 101 is an example and is not limited to this. For example, multiple biological information acquiring units 111 may be included and configured to acquire biological information of different persons to be subjected to authentication, respectively. Alternatively, the biological information acquiring unit 111, the feature amount extracting unit 121, the registering unit 131, the similarity calculating unit 141, the similarity map generating unit 151, the selecting unit 161, the authenticating unit 171, and the storage unit 181, or arbitrary combinations thereof may be installed in different devices coupled to each other via a network and may be configured as a system having the same functions as the biological authentication device 101. For example, the biological authentication device 101 may not include the biological information acquiring unit 111 and may receive biological information from the biological information acquiring unit 111 coupled via a network.

Next, a process of extracting a feature amount by the feature amount extractor 121 is described.

Figure 4:
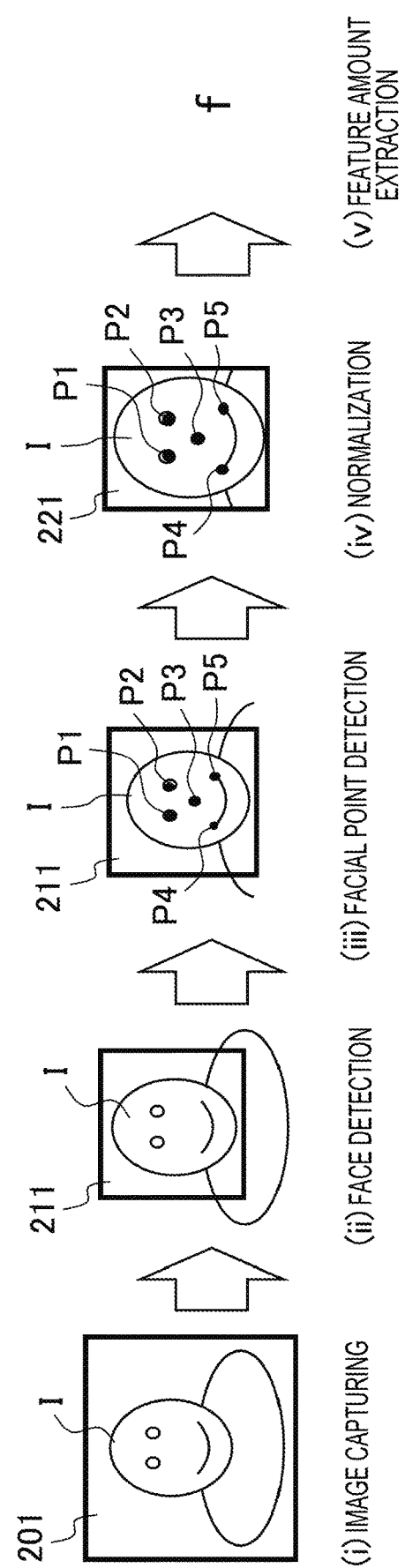
FIG. 4 is a diagram illustrating a process of extracting a feature amount.

FIG. 4 is a diagram illustrating the process of extracting a feature amount.

FIG. 4 describes the case where a feature amount of a single target person (registered person or person to be subjected to authentication) is extracted. This case assumes that the biological information acquiring unit 111 is a color camera.

(i) The biological information acquiring unit 111 images the target person and captures an image 201 including biological information I. The captured image 201 includes the face of the target person, and an image (facial image) of the face corresponds to the biological information I.

(ii) The feature amount extracting unit 121 detects the face of the target person included in the captured image 201 and detects a rectangular region including the detected face as a facial region 211.

(iii) The feature amount extracting unit 121 detects facial points P1 to P5 of the face included in the facial region 211. The facial points of the face are, for example, the eyes, the nose, and both ends of the mouth.

(iv) The feature amount extracting unit 121 normalizes the facial region 211 to generate a normalized image 221. For example, the feature amount extracting unit 121 executes a process of enlarging, reducing, or rotating the facial region 211 to generate the normalized image 221 in which the positions (positions of the eyes, the nose, and the mouth) of the facial points P1 to P5 match predetermined positions.

(v) The feature amount extracting unit 121 extracts an image feature amount of the normalized image 221. As the image feature amount, a local binary pattern (LBP), a histogram of gradient (HoG), or the like is used. The extracted image feature amount is used as a feature amount f of the biological information I of the target person.

When facial images of multiple persons are included in the captured image 201, the feature amount extracting unit 121 extracts multiple feature amounts of the facial images of the multiple persons.

Figure 5:
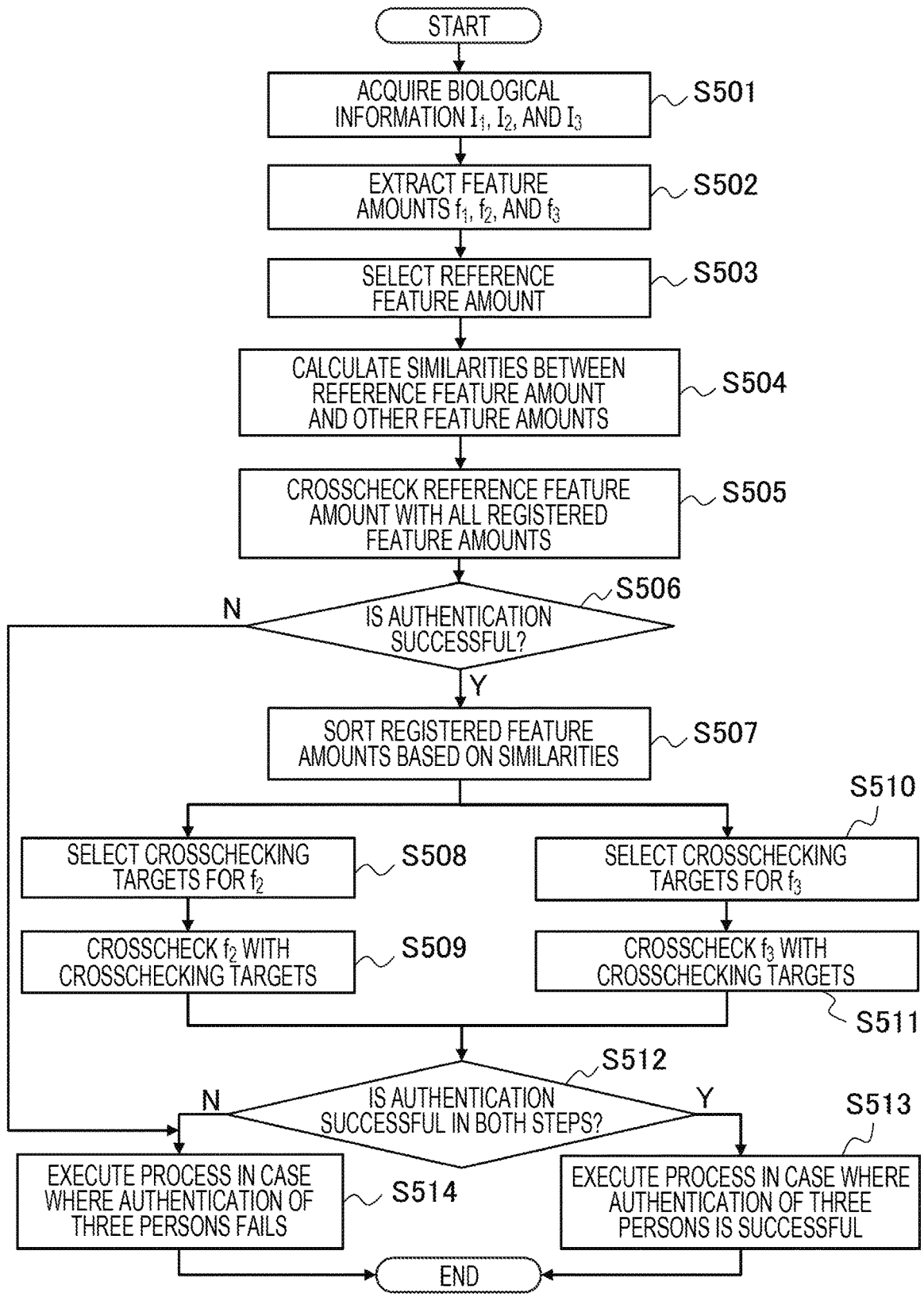
FIG. 5 is a flowchart of a biological authentication process according to the embodiment.

FIG. 5 is a flowchart of the biological authentication process according to the embodiment.

FIGS. 6 to 9 are diagrams describing the biological authentication process according to the embodiment.

In the biological authentication process according to the embodiment, the biological authentication device 101 captures an image including faces of three persons to be subjected to authentication at one time, executes authentication on the three persons to be subjected to authentication, and executes a predetermined process when the authentication of the three persons is successful.

Figure 6:
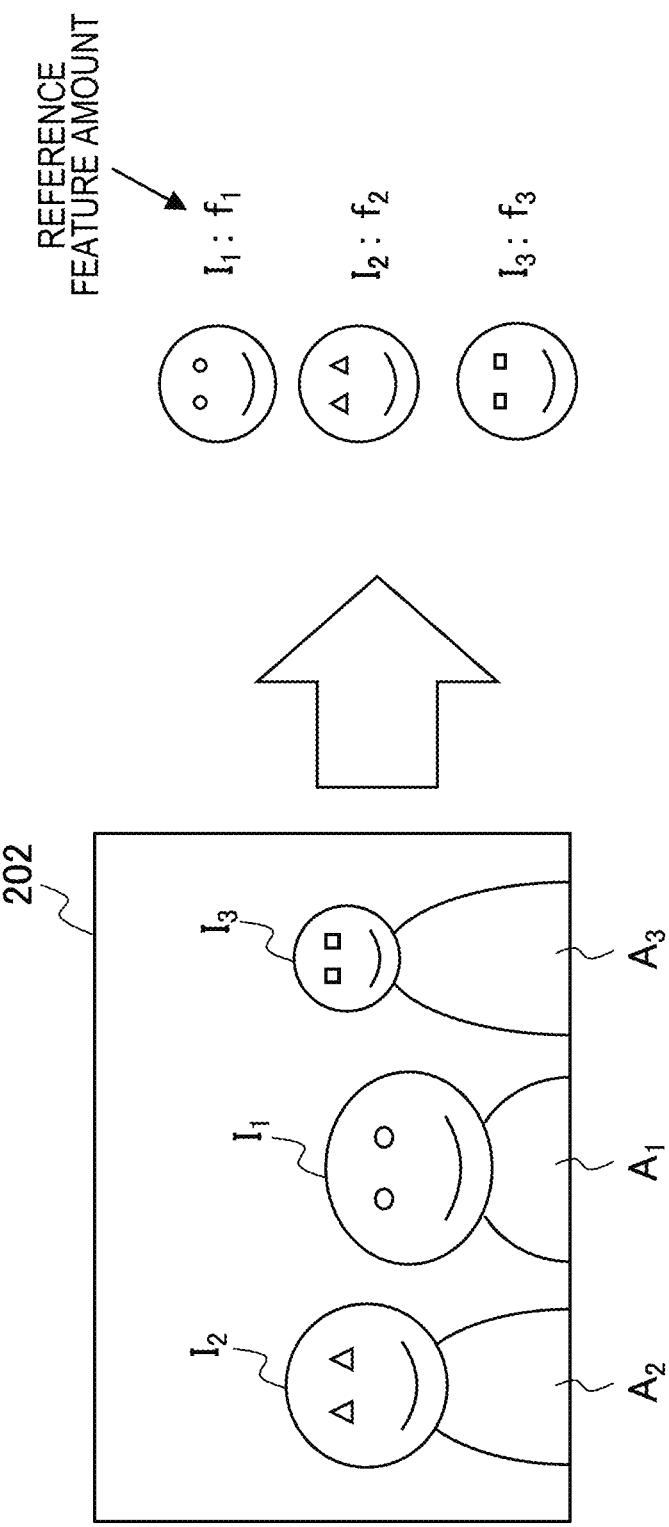
FIG. 6 is a first diagram describing the biological authentication process according to the embodiment.

In step S501, the biological information acquiring unit 111 acquires biological information $I_1$ to $I_3$ of the three persons $A_1$ to $A_3$ to be subjected to authentication. For example, the biological information acquiring unit 111 images faces of the three persons $A_1$ to $A_3$, at one time, to generate a captured image 202 (FIG. 6). As illustrated in FIG. 6, the captured image 202 includes facial images of the three persons $A_1$ to $A_3$ as the biological information $I_1$ to $I_3$. Since the single camera (biological information acquiring unit 111) may simultaneously acquire biological information of multiple persons in face authentication, the authentication may be efficiently executed.

In step S502, the feature amount extracting unit 121 extracts feature amounts $f_1$ to $f_3$ from the biological information $I_1$ to $I_3$ (FIG. 6).

In step S503, the similarity calculating unit 141 selects a reference feature amount from among the feature amounts $f_1$ to $f_3$. In this case, the feature amount $f_1$ is selected as the reference feature amount. The similarity calculating unit 141 may select, as the reference feature amount, a feature amount of the largest facial image among the facial images corresponding to the biological information included in the captured image 202, for example.

Figure 7:
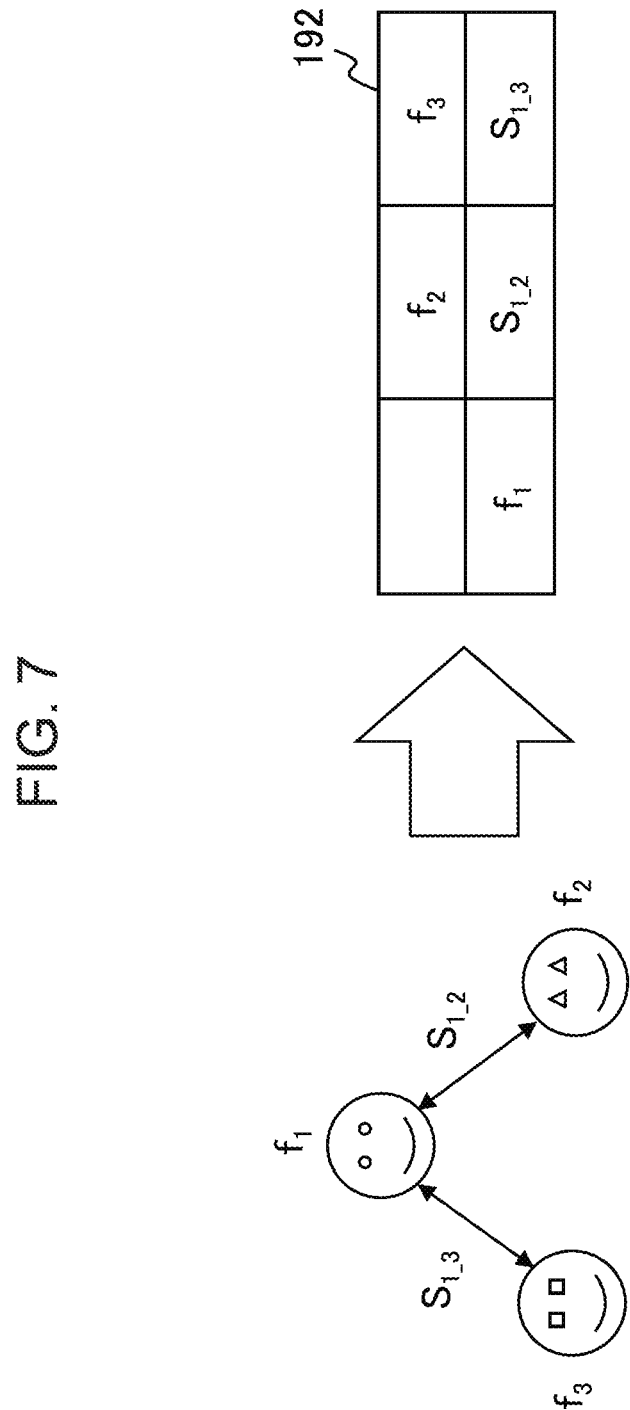
FIG. 7 is a second diagram describing the biological authentication process according to the embodiment.

In step S504, the similarity calculating unit 141 calculates similarities between the reference feature amount and the feature amounts extracted in step S502 and excluding the reference feature amount. For example, the similarity calculating unit 141 calculates a similarity $S_{1\_2}$ between the feature amount $f_1$ serving as the reference feature amount and the feature amount $f_2$, and a similarity $S_{1\_3}$ between the feature amount $f_1$ serving as the reference feature amount and the feature amount $f_3$. The similarity map generating unit 151 records the calculated similarities in the similarity map 192 (FIG. 7). Thus, the similarity $S_{1\_2}$ between the feature amount $f_1$ serving as the reference feature amount and the feature amount $f_2$, and the similarity $S_{1\_3}$ between the feature amount $f_1$ serving as the reference feature amount and the feature amount $f_3$ are recorded in the similarity map 192.

In step S505, the similarity calculating unit 141 and the authenticating unit 171 crosscheck the feature amount $f_1$ serving as the reference feature amount with the registered feature amounts $t_1$ to $t_N$ recorded in the DB 191. In step S506, the authenticating unit 171 determines whether or not the authentication of the person $A_1$ to be subjected to authentication is successful. For example, the similarity calculating unit 141 calculates similarities $St_1$ to $St_N$ between the feature amount $f_1$ serving as the reference feature amount and the registered feature amounts $t_1$ to $t_N$, respectively. The authenticating unit 171 references the similarities $St_1$ to $St_N$ and determines that the authentication of the person $A_1$ to be subjected to authentication is successful when at least one of the similarities $St_1$ to $St_N$ is equal to or larger than the threshold. The authenticating unit 171 determines that the authentication of the person $A_1$ to be subjected to authentication fails when all the similarities $St_1$ to $St_N$ are smaller than the threshold. In addition, the similarity calculating unit 141 associates the similarities $St_1$ to $St_N$ with the registered feature amounts $t_1$ to $t_N$, respectively When the authentication of the person $A_1$ to be subjected to authentication is successful in step S506, the process proceeds to step S507. When the authentication of the person $A_1$ to be subjected to authentication is not successful in step S506, the process proceeds to step S514.

Figure 8:
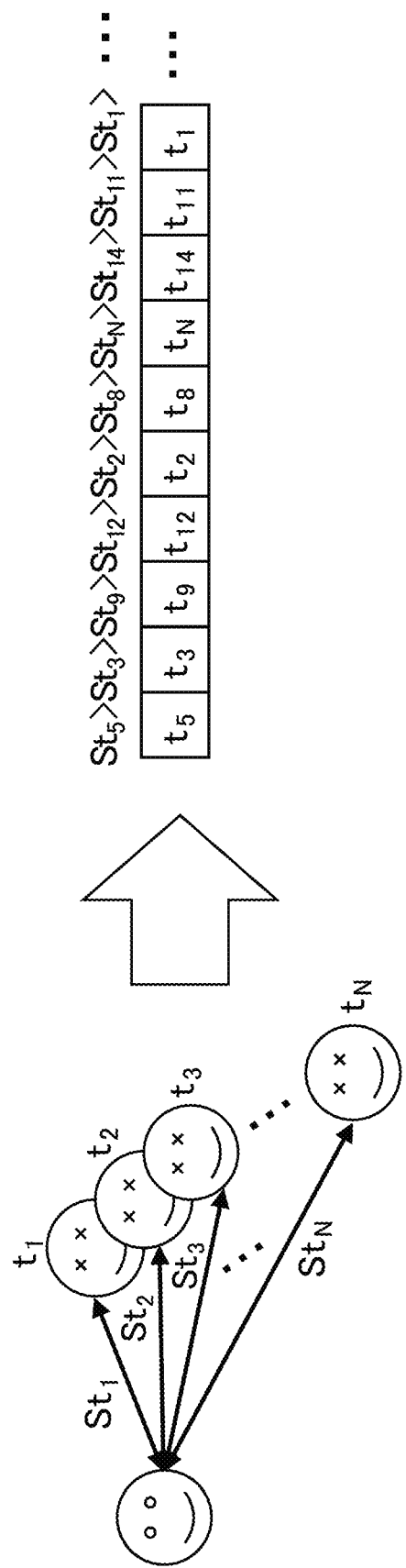
FIG. 8 is a third diagram describing the biological authentication process according to the embodiment.

In step S507, the selecting unit 161 sorts the registered feature amounts $t_1$ to $t_N$ in order of descending similarities (FIG. 8). In FIG. 8, the registered feature amounts $t_1$ to $t_0$ are arranged from left to right in order of descending similarities.

In FIG. 8, the similarity decreases in the order of $St_5$, $St_3$, $St_9$, $St_{12}$, $St_2$, $St_8$, $St_N$, $St_{14}$, $St_{11}$, $St_1$, . . . . Thus, the registered feature amounts $t_1$ to $t_n$ are sorted in the order of $t_5$, $t_3$, $t_9$, $t_{12}$, $t_2$, $t_8$, $t_N$, $t_{14}$, $t_{11}$, $t_1$, . . . .

Steps S508 and S510 are executed in parallel. Steps S509 and S511 are executed in parallel. Steps S508 to S511 may be executed in series.

In step S508, the selecting unit 161 selects, from among the sorted registered feature amounts, crosschecking targets T1 to be used to calculate similarities with the feature amount $f_2$. For example, the selecting unit 161 detects a registered feature amount $t_x$ associated with a similarity $St_x$ (x=any of 1 to N) closest to the similarity $S_{1\_2}$. The selecting unit 161 selects, as the crosschecking targets T1, the registered feature amount $t_x$, a number α of registered feature amounts among the sorted registered feature amounts from the position of the registered feature amount $t_x$ in order of ascending similarities, and a number α of registered feature amounts among the sorted registered feature amounts from the position of the registered feature amount $t_x$ in order of descending similarities. For example, α is a % (a is, for example, 10) of the number N of registered feature amounts $t_1$ to $t_N$. In addition, α may be equal to 0, and the selecting unit 161 may select, as a crosschecking target T1, only the registered feature amount $t_x$ associated with the similarity $St_x$ closest to the similarity $S_{1\_2}$. Thus, a registered feature amount, which is reasonably considered to be most likely to be a feature amount of a target person, may be selected, thereby improving the probability that the target person is successfully authenticated based on crosschecking executed once.

Figure 9:
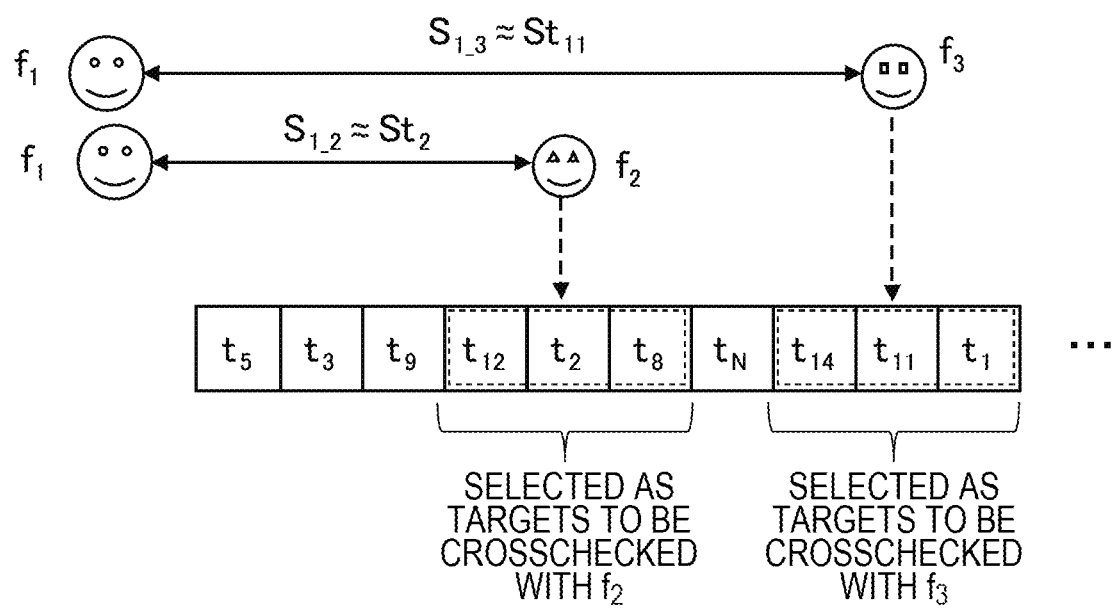
FIG. 9 is a fourth diagram describing the biological authentication process according to the embodiment.

FIG. 9 assumes that the similarity $St_2$ is the closest to the similarity $S_{1\_2}$ and that α=1. The selecting unit 161 selects, as the crosschecking targets T1, the feature amount $t_2$ associated with the similarity $St_2$, a single registered feature amount $t_{12}$ among the sorted registered feature amounts from the position of the registered feature amount $t_2$ in order of ascending similarities, and a single registered feature amount $t_8$ among the sorted registered feature amounts from the position of the registered feature amount $t_2$ in order of descending similarities.

In step S509, the similarity calculating unit 141 and the authenticating unit 171 crosscheck the feature amount $f_2$ with the crosschecking targets T1 and determine whether or not the authentication of the person $A_2$ to be subjected to authentication is successful. For example, the similarity calculating unit 141 calculates similarities between the feature amount $f_2$ and the registered feature amounts selected as the crosschecking targets T1. The authenticating unit 171 determines whether or not at least one of the similarities calculated in step S509 is equal to or larger than the threshold. When at least one of the similarities is equal to or larger than the threshold, the authenticating unit 171 determines that the authentication of the person $A_2$ to be subjected to authentication is successful. When all the similarities calculated in step S509 are smaller than the threshold, the authenticating unit 171 determines that the authentication of the person $A_2$ to be subjected to authentication fails.

When the authentication of the person $A_2$ to be subjected to authentication is successful, or when a registered feature amount $t_z$ whose similarity with the feature amount $f_2$ is equal to or larger than the threshold exists, it is considered that the similarity $St_{1\_2}$ between the feature amount $f_1$ and the feature amount $f_2$ is close to a similarity $St_z$ between the feature amount $f_1$ and the feature amount $t_z$. When the similarity $St_{1\_2}$ is away from a similarity $St_4$ between the feature amount $f_1$ and a feature amount $t_4$, it is considered that the authentication of the person $A_2$ to be subjected to authentication is not successful, and it is considered that the registered feature amount $t_4$ may be excluded from crosschecking targets. Thus, the selecting unit 161 selects, as a target T1 to be crosschecked with the feature amount $f_2$, a registered feature amount that is among the registered feature amounts $t_i$ (i=1 to N) and whose similarity with the feature amount $f_1$ is close to the similarity $St_{1\_2}$. Thus, the selecting unit 161 may reduce the number of registered feature amounts to be used to calculate similarities. Accordingly, the number of times that the process of calculating a similarity is executed may be reduced and the authentication process may be executed at high speed.

In step S510, the selecting unit 161 selects, from among the sorted registered feature amounts, a crosschecking target T2 whose similarity with the feature amount $f_3$ is to be calculated. For example, the selecting unit 161 detects a registered feature amount $t_y$ associated with a similarity $St_y$ (y=any of 1 to N) closest to the similarity $S_{1\_3}$. The selecting unit 161 selects, as crosschecking targets T2, the registered feature amount $t_y$, a number α of registered feature amounts among the sorted registered feature amounts from the position of the registered feature amount $t_y$ in order of ascending similarities, and a number α of registered feature amounts among the sorted registered feature amounts from the position of the registered feature amount $t_y$ in order of descending similarities.

FIG. 9 assumes that the similarity $St_{11}$ is the closest to the similarity $S_{1\_3}$. In addition, FIG. 9 also assumes that α=1. The selecting unit 161 selects, as crosschecking targets T2, a feature amount $t_{11}$ associated with the similarity $St_{11}$, a single registered feature amount $t_{14}$ among the sorted registered feature amounts from the position of the registered feature amount $t_{11}$ in order of ascending similarities, and a single registered feature amount $t_1$ among the sorted registered feature amounts from the position of the registered feature amount $t_{11}$ in order of descending similarities. Since the crosschecking targets T2 are selected based on similarities with the feature amount $f_1$ in the authentication of the person $A_3$ to be subjected to authentication, the arrangement of the registered feature amounts $t_i$ (i=1 to N) used in the authentication of the person $A_2$ to be subjected to authentication is used in the authentication of the person $A_3$ to be subjected to authentication. The calculation of similarities with all the registered feature amounts and the sorting based on the similarities with the registered feature amounts may not be executed again. Even when the number of persons to be subjected to authentication increases, an increase in a time period for the authentication may be suppressed.

In step S511, the similarity calculating unit 141 and the authenticating unit 171 crosscheck the feature amount $f_3$ with the crosschecking targets T2 and determine whether or not the authentication of the person $A_3$ to be subjected to authentication is successful. For example, the similarity calculating unit 141 calculates similarities between the feature amount $f_3$ and the registered feature amounts selected as the crosschecking targets T2. The authenticating unit 171 determines whether or not any of the similarities calculated in step S511 is equal to or larger than the threshold. When any of the similarities is equal to or larger than the threshold, the authenticating unit 171 determines that the authentication of the person $A_3$ to be subjected to authentication is successful. When all the similarities calculated in step S511 are smaller than the threshold, the authenticating unit 171 determines that the authentication of the person $A_3$ to be subjected to authentication fails.

In step S512, the authenticating unit 171 determines whether or not the authentication is successful in both steps S509 and S511. When the authentication is successful in both steps S509 and S511, the process proceeds to step S513. When at least one of the authentication executed in step S509 and the authentication executed in step S511 is not successful, the process proceeds to step S514.

In step S513, the authenticating unit 171 executes a predetermined process in the case where the authentication of the three persons is successful. For example, the authenticating unit 171 executes a process of unlocking a door of a room that is a security area, for example.

In step S514, the authenticating unit 171 executes a predetermined process in the case where the authentication of the three persons fails. For example, the authenticating unit 171 executes a process of notifying the failure of the authentication executed on the target persons, a process of requesting a re-entry of biological information, or the like.

Although the embodiment describes the case where the number of persons to be subjected to authentication is 3 in the biological authentication process according to the embodiment, the number of persons to be subjected to authentication is not limited to 3 and may be 2 or 4 or more.

In the biological authentication device according to the embodiment, the process of executing authentication on multiple persons may be executed at high speed. When simultaneous authentication of a number M (M is an integer of 2 or more) of persons is executed and the number of registered feature amounts of biological information is N, a biological authentication device based on the related art calculates similarities between a number M of feature amounts and the number N of feature amounts, and the number of times that a similarity is calculated by the biological authentication device based on the related art is M×N. On the other hand, the biological authentication device according to the embodiment calculates similarities between a feature amount of a first person and a number N of feature amounts in the determination of the authentication of the first person and calculates similarities between feature amounts of second and later persons and a number $2\alpha+1$ of feature amounts among the number N of feature amounts of biological information in the determination of the authentication of the second and later persons. Thus, the number of times that a similarity is calculated by the biological authentication device according to the embodiment is $N+(M-1)\times(2\alpha+1)$ and is reduced. Since the number of times that a similarity is calculated in the authentication process is reduced, the authentication process is executed at high speed.

In a related art technique, the speed of an authentication process is increased by using a low-accuracy feature amount such as a thumbnail of an image or by executing a parallel process. In the related art technique, however, the accuracy of narrowing down a large number of persons is reduced due to the low-accuracy feature amount, a large number of calculators are used for the parallel process, and the cost is increased.

In the biological authentication device according to the embodiment, a low-accuracy feature amount is not used and the process of executing simultaneous authentication on multiple persons may be executed at high speed without using an additional computer for executing a parallel process.

Figure 10:
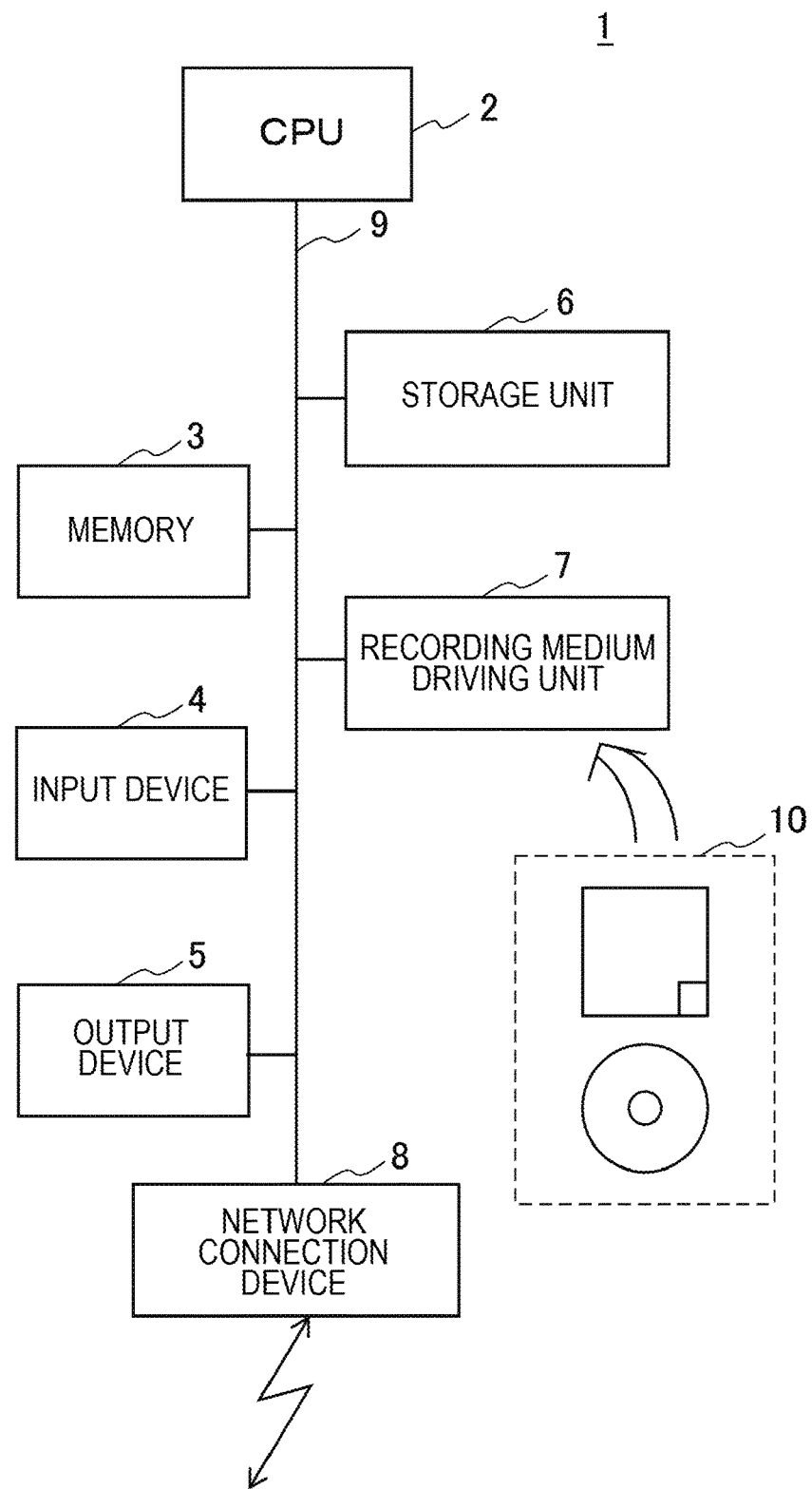
FIG. 10 is a diagram illustrating a configuration of an information processing device (computer).

FIG. 10 is a diagram illustrating a configuration of an information processing device (computer).

The biological authentication device 101 according to the embodiment may be enabled by an information processing device (computer) 1 illustrated in FIG. 10, for example.

The information processing device 1 includes a central processing unit (CPU) 2, a memory 3, an input device 4, an output device 5, a storage unit 6, a recording medium driving unit 7, and a network connection device 8, which are coupled to each other via a bus 9. The biological information acquiring unit 111 illustrated in FIG. 1 may be coupled to the bus 9.

The CPU 2 is a central processing unit (processor) configured to control the entire information processing device 1.

The CPU 2 operates as the feature amount extracting unit 121, the registering unit 131, the similarity calculating unit 141, the similarity map generating unit 151, the selecting unit 161, and the authenticating unit 171.

The memory 3 is a read only memory (ROM), a random access memory (RAM), or the like and is configured to temporarily store a program stored in the storage unit 6 (or the portable recording medium 10) or data stored in the storage unit 6 (or the portable recording medium 10) upon the execution of the program. The CPU 2 executes the program using the memory 3, thereby executing the aforementioned various processes.

The input device 4 is used to input an instruction or information from a user or an operator and acquire data to be used by the information processing device 1. The input device 4 is, for example, a keyboard, a mouse, a touch panel, or the like.

The output device 5 operates under control by the CPU 2 and outputs an inquiry or a processing result to the user or the operator. The output device 5 is, for example, a display, a printer, or the like.

The storage unit 6 is, for example, a magnetic disk device, an optical disc device, a tape device, or the like. The information processing device 1 stores the aforementioned program and the aforementioned data in the storage unit 6 and may read the program and the data into the memory 3 and use the program and the data. The storage unit 6 corresponds to the storage unit 181.

The recording medium driving unit 7 drives the portable recording medium 10 and accesses details recorded in the portable recording medium 10. As the portable recording medium, an arbitrary computer-readable recording medium such as a memory card, a flexible disk, a compact disc read only memory (CD-ROM), an optical disc, or a magneto-optical disc is used. The user causes the aforementioned program and the aforementioned data to be stored in the portable recording medium 10 and may read the program and the data into the memory 3 and use the program and the data.

The network connection device 8 is a communication interface coupled to an arbitrary communication network such as a local area network (LAN) or a wide area network (WAN) and configured to convert data for communication. The network connection device 8 is configured to transmit data to a device coupled via the communication network and receive data from a device coupled via the communication network.

The information processing device 1 may not include all the constituent elements illustrated in FIG. 10, and one or more of the constituent elements may be omitted depending on the use and conditions.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biological authentication device comprising:
a memory configured to store multiple registered feature amounts of biological information acquired from multiple registered persons; and
a processor coupled to the memory and configured to:
calculate a first similarity between a first feature amount of first biological information acquired from a first person among multiple persons to be subjected to authentication and a second feature amount of second biological information acquired from a second person among the multiple persons to be subjected to authentication, and calculate multiple second similarities between the first feature amount and the multiple registered feature amounts,
execute authentication on the first person to be subjected to authentication, based on the multiple second similarities, and
when the authentication of the first person to be subjected to authentication is successful, select first registered feature amounts to be subjected to similarity calculation from among the multiple registered feature amounts, based on the first similarity and the multiple second similarities, wherein
the processor is configured to:
calculate third similarities between the second feature amount and the first registered feature amounts, and
execute, based on the third similarities, authentication on the second person to be subjected to authentication.

2. The biological authentication device of claim 1, wherein:
the multiple second similarities are associated with the multiple registered feature amounts, respectively, and
the processor is configured to select, as the first registered feature amounts to be subjected to similarity calculation, a registered feature amount associated with one of the multiple second similarities which is closest to the first similarity.

3. The biological authentication device of claim 2, wherein
the processor is configured to:
sort the multiple registered feature amounts, based on the multiple second similarities, and
select, as the first registered feature amounts to be subjected to similarity calculation, a predetermined number of registered feature amounts among the sorted multiple registered feature amounts from a position of the sorted registered feature amount associated with one of the multiple second similarities closest to the first similarity, in ascending order of second similarity, and select, as the first registered feature amounts to be subjected to similarity calculation, a predetermined number of registered feature amounts among the sorted multiple registered feature amounts from a position of the sorted registered feature amount associated with one of the multiple second similarities closest to the first similarity, in descending order of second similarity.

4. The biological authentication device of claim 1, wherein
the processor is configured to:
for a third person that is any one of the multiple persons to be subjected to authentication other than the first and second persons, calculate a fourth similarity between the first feature amount and a third feature amount of third biological information acquired from the third person,
when the authentication of the first person is successful, select second registered feature amounts to be subjected to similarity calculation from among the multiple registered feature amounts, based on the fourth similarity and the multiple second similarities,
calculate fifth similarities between the third feature amount and the second registered feature amounts to be subjected to similarity calculation, and
execute authentication on the third person, based on the fifth similarities.

5. The biological authentication device of claim 1, wherein
the processor is further configured to
simultaneously acquire biological information including the first biological information and the second biological information from the multiple persons to be subjected to authentication.

6. An biological authentication method executed by a processor included in a biological authentication device, the biological authentication method comprising:
calculating a first similarity between a first feature amount of first biological information acquired from a first person among multiple persons to be subjected to authentication and a second feature amount of second biological information acquired from a second person among the multiple persons to be subjected to authentication;
calculating multiple second similarities between the first feature amount and multiple registered feature amounts of biological information acquired from multiple registered persons;
executing authentication on the first person, based on the multiple second similarities;
when the authentication of the first person is successful, selecting first registered feature amounts to be subjected to similarity calculation from among the multiple registered feature amounts, based on the first similarity and the multiple second similarities;
calculating third similarities between the second feature amount and the first registered feature amounts; and
executing, based on the third similarities, authentication on the second person to be subjected to authentication.

7. The biological authentication method of claim 6, wherein:
the multiple second similarities are associated with the multiple registered feature amounts, respectively; and
the biological authentication method includes selecting, as the first registered feature amounts to be subjected to similarity calculation, a registered feature amount associated with one of the multiple second similarities which is closest to the first similarity.

8. The biological authentication method of claim 7, further comprising:
sorting the multiple registered feature amounts, based on the multiple second similarities; and
selecting, as the first registered feature amounts to be subjected to similarity calculation, a predetermined number of registered feature amounts among the sorted multiple registered feature amounts from a position of the sorted registered feature amount associated with one of the multiple second similarities closest to the first similarity, in ascending order of second similarity, and select, as the first registered feature amounts to be subjected to similarity calculation, a predetermined number of registered feature amounts among the sorted multiple registered feature amounts from a position of the sorted registered feature amount associated with one of the multiple second similarities closest to the first similarity, in descending order of second similarity.

9. The biological authentication method of claim 6, further comprising:
for a third person that is any one of the multiple persons to be subjected to authentication other than the first and second persons, calculating a fourth similarity between the first feature amount and a third feature amount of third biological information acquired from the third person;
when the authentication of the first person is successful, selecting second registered feature amounts to be subjected to similarity calculation from among the multiple registered feature amounts, based on the fourth similarity and the multiple second similarities;
calculating fifth similarities between the third feature amount and the second registered feature amounts to be subjected to similarity calculation; and
executing authentication on the third person, based on the fifth similarities.

10. The biological authentication method of claim 6, further comprising:
simultaneously acquiring biological information including the first biological information and the second biological information from the multiple persons to be subjected to authentication.

11. A non-transitory, computer-readable recording medium having stored therein a program for causing a computer to execute a process comprising:
calculating a first similarity between a first feature amount of first biological information acquired from a first person among multiple persons to be subjected to authentication and a second feature amount of second biological information acquired from a second person among the multiple persons to be subjected to authentication;
calculating multiple second similarities between the first feature amount and the multiple registered feature amounts of biological information acquired from multiple registered persons;
executing authentication on the first person, based on the multiple second similarities;
when the authentication of the first person is successful, selecting first registered feature amounts to be subjected to similarity calculation from among the multiple registered feature amounts, based on the first similarity and the multiple second similarities;
calculating third similarities between the second feature amount and the first registered feature amounts; and
executing, based on the third similarities, authentication on the second person to be subjected to authentication.

12. The non-transitory, computer-readable recording medium of claim 11, wherein:
the multiple second similarities are associated with the multiple registered feature amounts, respectively; and
the process includes selecting, as the first registered feature amounts to be subjected to similarity calculation, a registered feature amount associated with one of the multiple second similarities which is closest to the first similarity.

13. The non-transitory, computer-readable recording medium of claim 12, the processor further comprising:
sorting the multiple registered feature amounts, based on the multiple second similarities; and
selecting, as the first registered feature amounts to be subjected to similarity calculation, a predetermined number of registered feature amounts among the sorted multiple registered feature amounts from a position of the sorted registered feature amount associated with one of the multiple second similarities closest to the first similarity, in ascending order of second similarity, and select, as the first registered feature amounts to be subjected to similarity calculation, a predetermined number of registered feature amounts among the sorted multiple registered feature amounts from a position of the sorted registered feature amount associated with one of the multiple second similarities closest to the first similarity, in descending order of second similarity.

14. The non-transitory, computer-readable recording medium of claim 11, the process further comprising:
for a third person that is any one of the multiple persons to be subjected to authentication other than the first and second persons, calculating a fourth similarity between the first feature amount and a third feature amount of third biological information acquired from the third person;
when the authentication of the first person is successful, selecting second registered feature amounts to be subjected to similarity calculation from among the multiple registered feature amounts, based on the fourth similarity and the multiple second similarities;
calculating fifth similarities between the third feature amount and the second registered feature amounts to be subjected to similarity calculation; and
executing authentication on the third person, based on the fifth similarities.

15. The non-transitory, computer-readable recording medium of claim 11, the process further comprising:
simultaneously acquiring biological information including the first biological information and the second biological information from the multiple persons to be subjected to authentication.

* * * * *